US010792951B2

(12) United States Patent
Berthe et al.

(10) Patent No.: US 10,792,951 B2
(45) Date of Patent: Oct. 6, 2020

(54) SECURITY DOCUMENT INCLUDING A LASERIZABLE LAYER AND A PATTERN FOR ILLUMINATING IN ORDER TO COLOR A GRAYSCALE IMAGE, AND CORRESPONDING FABRICATION AND READING METHODS

(71) Applicant: IDEMIA FRANCE, Colombes (FR)

(72) Inventors: Benoît Berthe, Colombes (FR); Coralie Vandroux, Colombes (FR)

(73) Assignee: IDEMIA FRANCE, Colombes (FR)

(*) Notice: Subject to any disclaimer, the term of this patent is extended or adjusted under 35 U.S.C. 154(b) by 0 days.

(21) Appl. No.: 15/681,029

(22) Filed: Aug. 18, 2017

(65) Prior Publication Data

US 2018/0050555 A1 Feb. 22, 2018

(30) Foreign Application Priority Data

Aug. 19, 2016 (FR) ..................................... 16 57820

(51) Int. Cl.
*B42D 25/41* (2014.01)
*B42D 25/23* (2014.01)
(Continued)

(52) U.S. Cl.
CPC ............... *B42D 25/41* (2014.10); *B41M 3/14* (2013.01); *B41M 5/267* (2013.01); *B42D 25/23* (2014.10); *B42D 25/309* (2014.10); *B42D 25/351* (2014.10); *B42D 25/455* (2014.10); *B42D 25/46* (2014.10); *G06K 9/00442* (2013.01);
(Continued)

(58) Field of Classification Search
None
See application file for complete search history.

(56) References Cited

U.S. PATENT DOCUMENTS

2010/0047488 A1* 2/2010 Syrjanen .................. B41M 3/14 428/29
2013/0328995 A1* 12/2013 Lazzari .................. B42D 25/00 347/232

(Continued)

FOREIGN PATENT DOCUMENTS

DE 102010062046 A1 5/2012
DE 102014217002 A1 3/2016

(Continued)

OTHER PUBLICATIONS

Preliminary Search Report dated May 9, 2017, French Application No. 1657820, pp. 1-2.

*Primary Examiner* — Vu Le
*Assistant Examiner* — Tracy Mangialaschi
(74) *Attorney, Agent, or Firm* — MH2 Technology Law Group, LLP

(57) ABSTRACT

A security document may include a laserizable first layer including a grayscale image formed by laserizing; a color pattern that is in alignment with the grayscale image; and a second layer arranged between the first layer and the pattern, such that the first layer is above the second layer, and the pattern is below the second layer. The second layer may be more opaque than the first layer, such that when observing the security document from the top, the grayscale image appears to be colored by the color pattern only when the bottom of the security document is being illuminated.

18 Claims, 3 Drawing Sheets

(51) Int. Cl.

| | |
|---|---|
| ***B42D 25/309*** | (2014.01) |
| ***B42D 25/351*** | (2014.01) |
| ***B42D 25/455*** | (2014.01) |
| ***G06K 9/00*** | (2006.01) |
| ***G06K 9/20*** | (2006.01) |
| ***G07D 7/20*** | (2016.01) |
| ***B41M 3/14*** | (2006.01) |
| ***G07D 7/12*** | (2016.01) |
| ***B41M 5/26*** | (2006.01) |
| ***B42D 25/46*** | (2014.01) |
| ***G06K 9/46*** | (2006.01) |

(52) U.S. Cl.
CPC ......... *G06K 9/2036* (2013.01); *G06K 9/4652* (2013.01); *G06K 9/4661* (2013.01); *G07D 7/12* (2013.01); *G07D 7/20* (2013.01)

(56) References Cited

U.S. PATENT DOCUMENTS

2013/0341900 A1* 12/2013 Lazzari .................. B41M 3/148 283/75
2014/0197626 A1* 7/2014 Le Loarer .............. B42D 25/29 283/85

FOREIGN PATENT DOCUMENTS

FR 2972553 A1 9/2012
WO 2015083099 A1 6/2015
WO WO 2015083099 A1 * 6/2015 ............. B42D 25/41

* cited by examiner

FIG.1
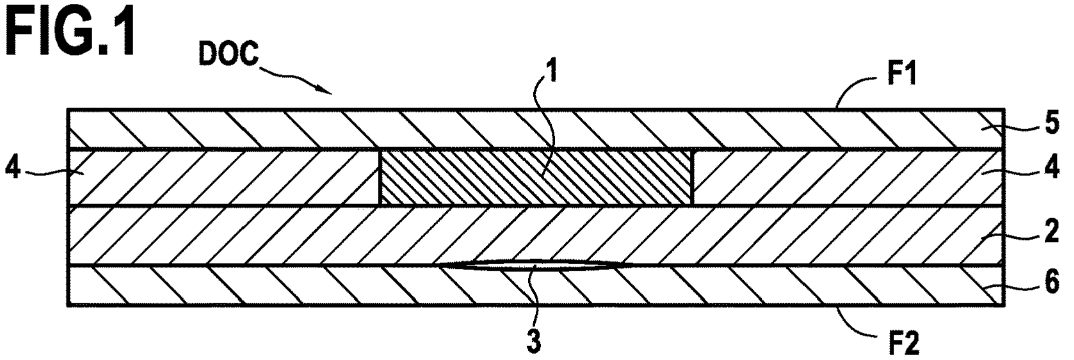
FIG.2
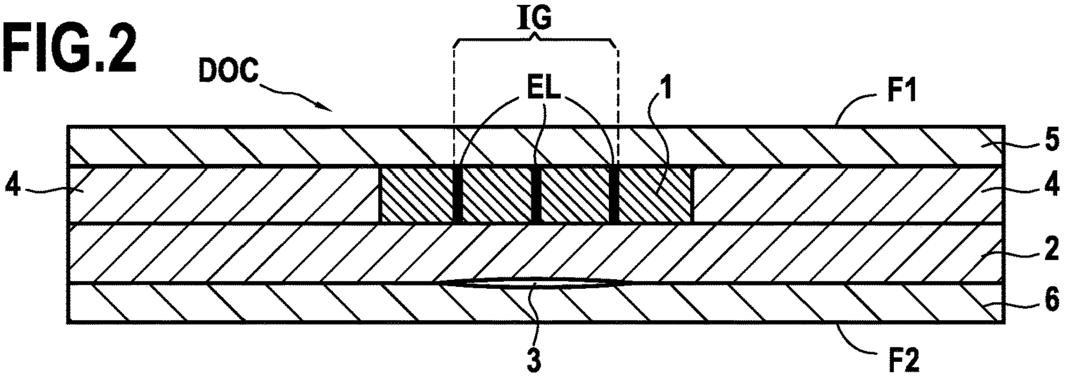
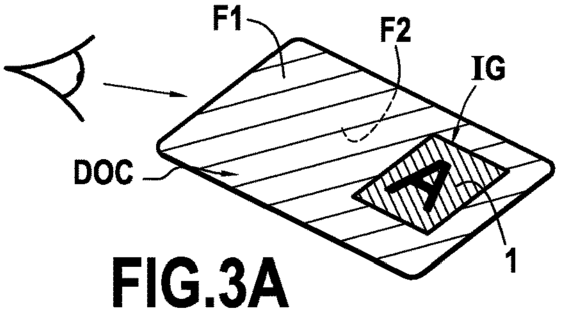
FIG.3A
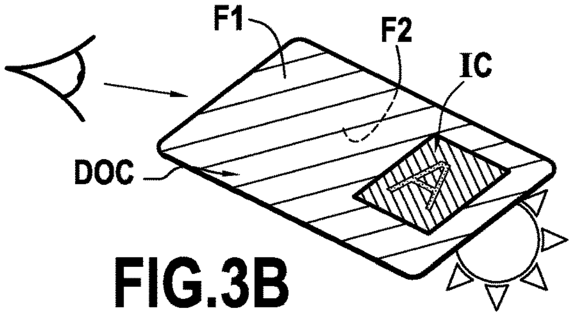
FIG.3B
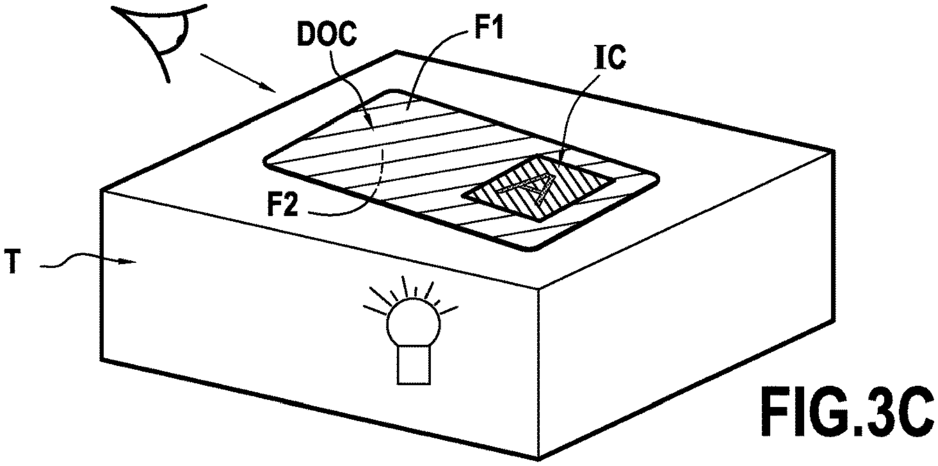
FIG.3C FIG.4
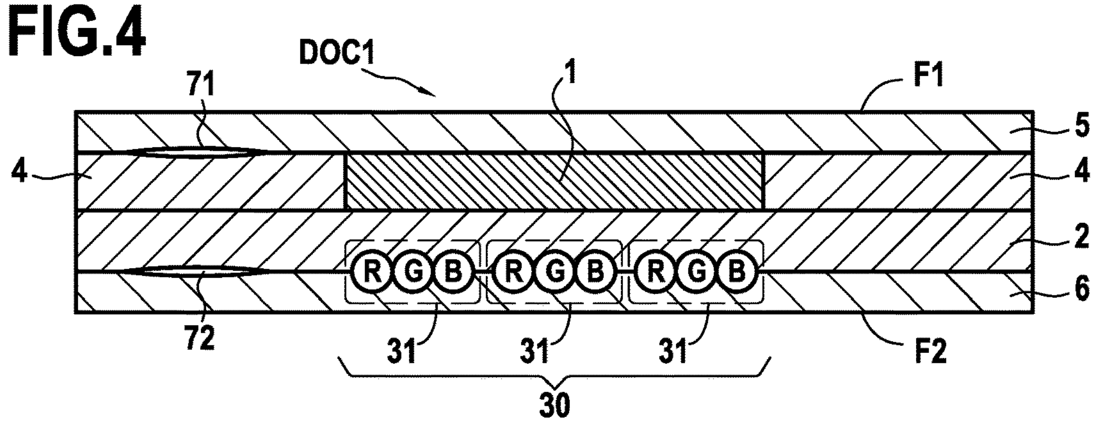
FIG.5
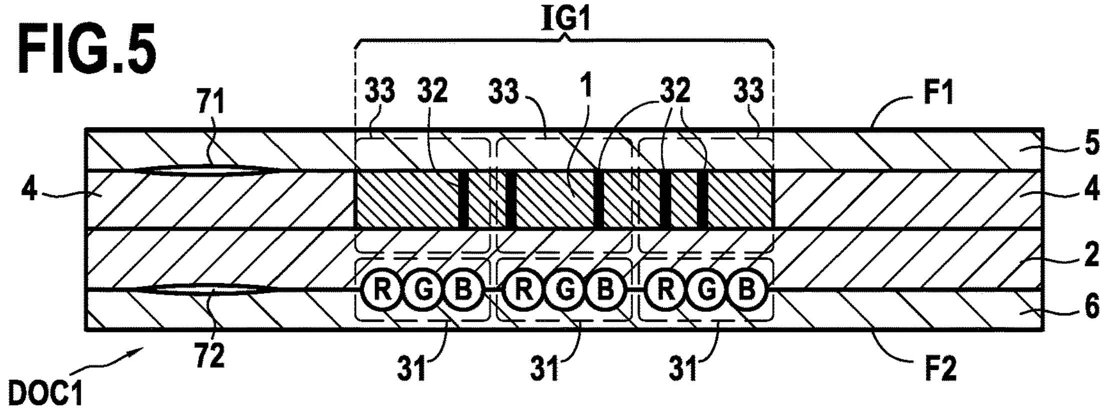
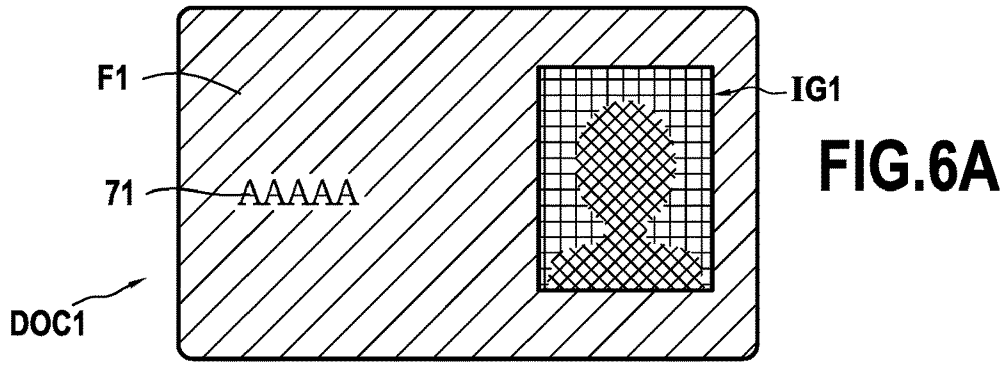
FIG.6A
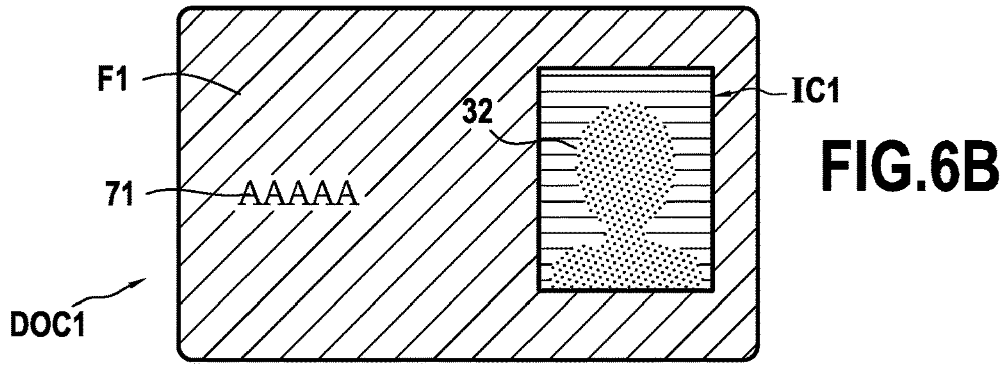
FIG.6B FIG.7
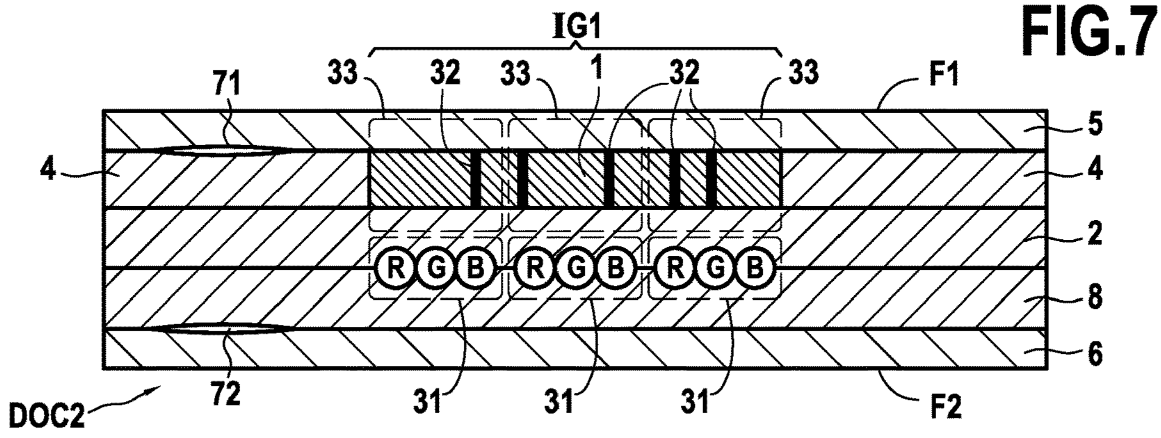
FIG.8
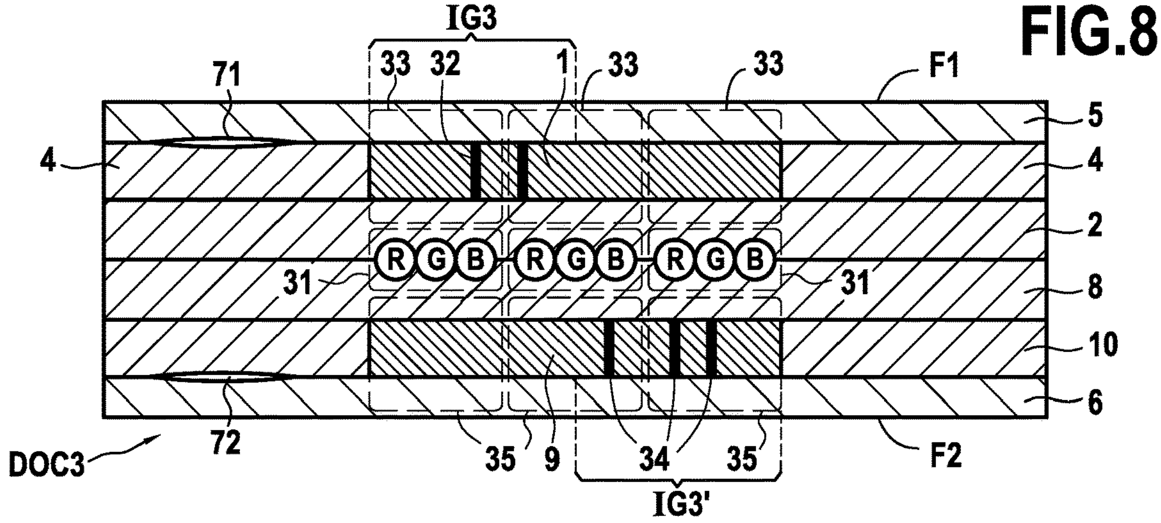
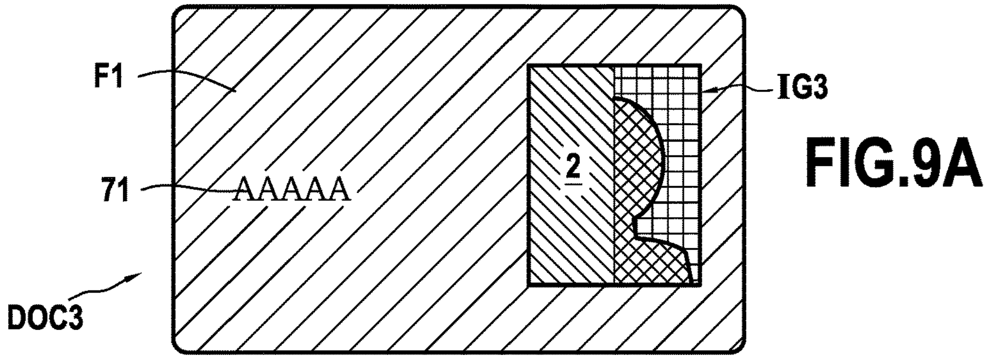
FIG.9A
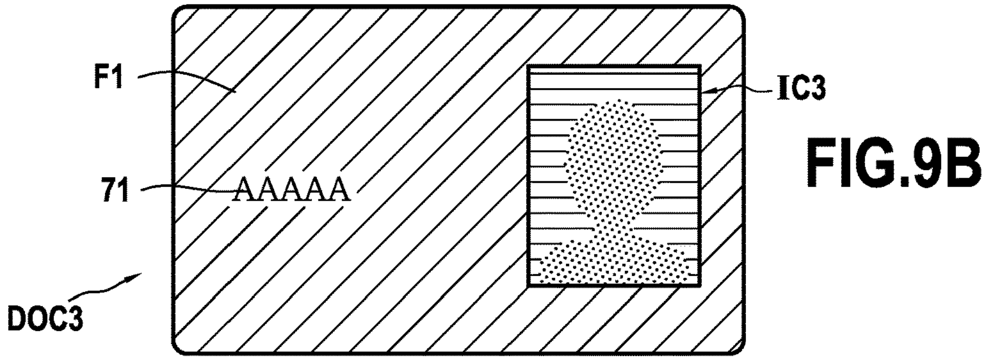
FIG.9B

SECURITY DOCUMENT INCLUDING A LASERIZABLE LAYER AND A PATTERN FOR ILLUMINATING IN ORDER TO COLOR A GRAYSCALE IMAGE, AND CORRESPONDING FABRICATION AND READING METHODS

CROSS-REFERENCE TO RELATED APPLICATIONS

This application claims priority to French Application No. 1657820 filed 19 Aug. 2016, the entire disclosure of which is hereby incorporated by reference in its entirety.

BACKGROUND OF THE INVENTION

The invention relates to the general field of security documents, e.g. identity documents, and in particular security documents that include a laserizable layer.

The term "laserizable" is used to mean that applying a laser beam to the layer (generally referred to as "laserizing") generates visible levels of gray by carbonizing in that layer. By way of indication, a laserizable layer may be a layer of transparent polycarbonate and may include additives that are sensitive to the passage of a laser beam such that the beam carbonizes them. Such a laserizable layer becomes black or at least partially grayed throughout its thickness, depending on the power of the laser, since the additives that are sensitive to the passage of a laser beam are distributed uniformly throughout the thickness of the layer.

The prior art includes document FR 2 972 553, which describes a method of forming a colored image by laserizing a grayscale image in a laserizable layer overlying a matrix of color pixels.

There exists a need for solutions providing greater security and that are difficult to reproduce.

The invention seeks in particular to obtain security documents that are more secure.

OBJECT AND SUMMARY OF THE INVENTION

The present invention satisfies this need by proposing a security document comprising:

- a laserizable first layer including a grayscale image formed by laserizing;
- a color pattern in alignment with said grayscale image; and
- a second layer arranged between said first layer and said pattern, the first layer being above the second layer, and said pattern being below the second layer; and
- the second layer being more opaque than the first layer, such that when observing the security document from the top, said grayscale image appears to be colored by the color pattern only when the bottom of the security document is being illuminated.

Thus, a user observing the security document from the top under ambient illumination and will see only a grayscale image. It is only by causing the bottom of the security document to face towards a source of light having light intensity or light power that is greater than that of the ambient illumination that the color pattern will transmit its colors by transparency to the top so that the image appears to be in color when viewed from the top. That is what is meant by the bottom of the security document being illuminated.

It will readily be understood that the intensity of ambient illumination can vary, however the person skilled in the art knows how to select a light source that is capable of causing an image that was initially a grayscale image to appear in color when looking at the top of the security document, even though the color is invisible without the selected light source.

Illuminating in this way is sometimes referred to by the person skilled in the art as "diascopic" illumination. For observing the security document from the top without illuminating the bottom of the card, the person skilled in the art uses the term "episcopic" illumination.

The grayscale image comprises various gray elements, each of a shade that can be varied by adjusting the parameters of the laser beam used for laserizing. The laserizing is performed in such a manner that the grayscale elements of the laserizable first layer are in alignment with the color pattern. This alignment may be achieved by taking account of the color of the color pattern, or of its shape.

The color pattern may have one color or a plurality of colors. The person skilled in the art knows how to select the thicknesses of the first and second layers, and also the opacity of the second layer as a function of the application. In particular, the person skilled in the art can adapt the thicknesses and the opacity as a function of the light source it is desired to use for causing the image to appear in color.

By way of indication, the light source that is used to make the pattern visible may be sunlight: by causing the bottom of the security document to face towards the sun, an image that is colored is caused to appear, whereas otherwise the image appears as a grayscale image.

It is also possible to use an appliance as a light source. The person skilled in the art knows how to select the parameters of the light source so that the image appears in color, e.g. at about 20 centimeters (cm) from the light source. These parameters may be the orientation and the focusing of the light beam, its light intensity, and/or the quantity of light.

Also, it should be observed that a document is obtained that is particularly secure, since once the document has been laserized, it is difficult to reproduce it for fraudulent purposes without having knowledge of the presence of the pattern and and thus of the alignment.

Furthermore, fraudulent reproduction of a color laserized image by making the final representation on a medium directly by printing (of the inkjet type) is then pointless. Specifically, in the present invention, it is essential to make the color pattern and the grayscale image separately, since it is only the grayscale image that is visible under ambient illumination. This makes fraudulent reproduction of this type of colored image more complicated.

It may be observed that in the present application, the terms "above" and "below" are used arbitrarily, and it can readily be understood that the security document can be turned over. Nevertheless, these terms are used herein relative to the order in which the two layers and the pattern are located in the assembly: the first layer on top, then the second layer, then the pattern.

In the same manner, the top of the security document is the face of the security document that is situated on the same side of the second layer as the first layer, and the bottom of the security document is the face of the security document that is situated on the same side of the second layer as the pattern.

Also, it may be observed that the laserizing may serve to personalize the security document so that it is associated with a user, whereas prior to being laserized it is a generic document.

In a particular embodiment, the color pattern includes at least two elements of different colors, and the laserizable first layer is laserized while taking account of the colors of said two elements of different colors.

Once they had been combined, the color pattern and the grayscale image formed in the laserizable layer can form a colored image that is particularly difficult to reproduce for fraudulent purposes, since the color pattern and the grayscale image are in alignment and such alignment is likewise difficult to reproduce since it takes account of the colors of the color pattern, e.g. in order to obtain a selected hue when the grayscale image appears colored.

By way of indication, it is possible to laserize the first layer so as to adjust the hue of the colored image by using a first intensity to laserize a portion of the laserizable first layer that is in alignment with an element of the color pattern that has a first color, and by using a second intensity to laserize a second portion of the laserizable first layer that is in alignment with an element of the color pattern that has a second color.

Thus, it is possible to adjust the color that is perceived when the security document is laserized, since the color of one of the elements will be less transmitted towards the top when the bottom of the security document is illuminated.

In a particular embodiment, the color pattern is a matrix of color pixels, each pixel comprising a plurality of sub-pixels of different colors, and the grayscale image includes grayscale pixels comprising grayscale sub-pixels in alignment with the sub-pixels of different colors in the color pattern.

All of the pixels of the matrix of color pixels may be identical, each being made out of the same sub-pixels having different colors.

By way of indication, the matrix of color pixels may be a matrix of pixels in which each color pixel includes at least one red sub-pixel, at least one green sub-pixel, and at least one blue sub-pixel (RGB system). Other matrices of color pixels are possible.

A grayscale pixel is associated with a grayscale level that depends on the grayscale level of each of its sub-pixels.

This enables laserization to form all possible color images, since for each grayscale pixel it is possible to darken the laserizable layer the color sub-pixel so as to adjust the final hue of the pixel observed from the top of the security document while it is being illuminated from the bottom.

In a particular embodiment, the security document further comprises a third layer below said color pattern, the third layer being more opaque than the first layer, and when observing the security document from the top, said grayscale image appears colored only when illuminating the bottom of the security document.

Thus, it is possible to colorize the initially grayscale image only by illuminating the top or the bottom of the security document with light of intensity that enables light to pass through the second layer and the third layer. This embodiment is even more difficult to reproduce by an ill-intentioned person who does not know that the color pattern is buried.

The person skilled in the art knows how to select the thicknesses of the second and third layers and also their opacities so that the pattern can be observed only by illuminating the security document with a suitably selected light source.

In a particular embodiment, the security document includes a laserizable fourth layer below said color pattern or below the third layer.

The security document thus has two laserizable layers in which grayscale images can be formed and that can cooperate with said pattern to form a complete image. This embodiment is even more difficult to reproduce for fraudulent purposes.

In a particular embodiment, the laserizable first layer is a window arranged within a fifth layer that is more opaque than the first layer.

In a particular embodiment, an additional pattern is formed above said fifth layer. This additional pattern may comprise an image or text, in particular if the security document is an identity document. The grayscale image may then be the identity photograph of the identity document.

In a particular embodiment, an additional pattern is formed below said third layer.

In a particular embodiment, the laserizable fourth layer includes an additional grayscale image formed by laserizing, the additional image of the laserizable fourth layer being in alignment with said color pattern (just like the grayscale image of the laserized first layer).

It can be understood that in this embodiment, when observing the top without specific illumination, it is the grayscale image of the laserizable first layer that can be seen, whereas when the security document is illuminated from the bottom, it is both colored images due to the two grayscale images that become superposed with the color pattern.

In a particular embodiment, the grayscale image of the laserizable first layer is associated with the additional grayscale image of the laserizable fourth layer in such a manner that when observing the security document from the top, a complete colored image appears only when the bottom of the security document is being illuminated.

In this embodiment, without specific illumination, it is only grayscale half-images from each side of the security document that can be seen. By illuminating the security document, e.g. from the bottom, a complete image is seen to appear, which image is potentially colored if the pattern is colored.

By way of indication, this makes it possible to complete a text that initially appears incomplete or in which the letters are incomplete, or indeed to add additional details to an image.

The invention also provides a fabrication method for fabricating a security document, the method comprising the following steps:

- assembling together a laserizable first layer and a second layer below the first layer;
- forming a color pattern below the second layer; and
- laserizing a grayscale image within the laserizable first layer, the color pattern being in alignment with said grayscale image;
- the second layer being more opaque than the first layer, such that when observing the security document from the top, said grayscale image appears to be colored by the color pattern only when the bottom of the security document is being illuminated.

In a particular implementation, the color pattern is formed by forming a color pattern having at least two elements of different colors, and the laserizable first layer is laserized while taking account of the colors of said two elements of different colors.

In a particular implementation, the color pattern is a matrix of color pixels, each pixel comprising a plurality of sub-pixels of different colors, and the grayscale image is formed by laserizing so that it includes grayscale pixels comprising grayscale sub-pixels in alignment with the sub-pixels of different colors in the color pattern.

In a particular implementation, a third layer is assembled below said color pattern, the third layer being more opaque than the first layer, and when observing the security document from the top, said grayscale image appears colored only when the bottom of the security document is being illuminated.

In a particular implementation, a laserizable fourth layer is also assembled below said pattern or below the third layer.

In a particular implementation, the first layer is a window that is arranged within a fifth layer that is more opaque than the first layer.

In a particular implementation, an additional pattern is formed above said fifth layer.

In a particular implementation, an additional pattern is formed below said third layer.

In a particular implementation, the laserizable fourth layer includes an additional grayscale image formed by laserizing, the additional image of the laserizable fourth layer being in alignment with said color pattern.

In a particular implementation, the grayscale image of the laserizable first layer is associated with the additional grayscale image of the laserizable fourth layer in such a manner that when observing the security document from the top, a complete colored image appears only when the bottom of the security document is being illuminated.

In a particular implementation, the laserizable first layer is laserized while the bottom of the security document is being illuminated.

The invention also provides a method of reading a security document obtained by the described method, wherein the security document is illuminated from the bottom and the security document is observed from the top.

BRIEF DESCRIPTION OF THE DRAWINGS

Other characteristics and advantages of the present invention appear from the following description made with reference to the accompanying drawings, which show an example having no limiting character.

In The Figures:

FIG. 1 is a section view of a security document in an embodiment of the invention;

FIG. 2 is a section view of the FIG. 1 security document after a laserizing step;

FIGS. 3A, 3B, and 3C show the FIG. 2 security document under different lighting conditions;

FIG. 4 is a section view of a security document in another embodiment of the invention;

FIG. 5 is a section view of the FIG. 4 security document after a laserizing step;

FIGS. 6A and 6B show the FIG. 5 security document under different lighting conditions;

FIG. 7 is a section view of a security document in another embodiment of the invention;

FIG. 8 is a section view of a security document in another embodiment of the invention; and FIGS. 9A and 9B show the FIG. 8 security document under different lighting conditions.

DETAILED DESCRIPTION OF EMBODIMENTS

There follows a description of a security document and of the methods for fabricating it and for reading it.

FIG. 1 is a section view of a security document DOC, e.g. a generic identity document that has not yet been personalized.

The security document DOC has a first laserizable layer 1, e.g. a layer of transparent polycarbonate that includes particles that can be carbonized by applying a laser beam (laserizing).

Under the laserizable first layer 1, there is assembled a second layer 2. The first and second layers are assembled together by a laminating method known to the person skilled in the art that consists in applying pressure to the plastics layers, possibly together with heat. The second layer 2 is partially opaque, e.g. white, and it may be a layer of polycarbonate filled with a white additive, or indeed a layer of transparent polycarbonate covered in printing performed using an ink filled with a with additive. Such a layer is not a laserizable layer. The thickness of this layer and its opacity are parameters that the person skilled in the art knows how to select so that with a selected light source the second layer becomes sufficiently transparent to be able to see an element located on the other side of this layer.

In order to adjust opacity, the person skilled in the art can select the concentration of an additive in the second layer 2. The additive may be titanium dioxide $TiO_2$, which makes it possible to have a layer that is very opaque, or it may be chalk (calcium carbonate $CaCO_3$).

In this example, the bottom of the second layer 2 has a color pattern 3 formed therein, e.g. by printing. This pattern 3 may be in a single color, or it may be in a plurality of colors.

Furthermore, in this example, the first layer is a window arranged within an opaque layer of polycarbonate referred to as the "fifth" layer 4, which may be of a composition that is the same as that of the second layer 2.

Above the defined assembly, there is a protective layer 5 of transparent polycarbonate overlying the first layer 1 and the fifth layer 4. Below the defined assembly, there is a protective layer 6 of polycarbonate. These protective layers 5 and 6 define the faces of the security document DOC that correspond to the top (written F1) and to the bottom (written F2) of the security document DOC.

FIG. 2 shows the security document of FIG. 1 after performing a laserizing step in which a laser beam is applied to the face F1, i.e. to the top of the security document.

After being laserized, grayscale elements EL appear in the laserizable first layer 1 so as to form a grayscale image IG. These laserized elements EL of the grayscale image IG are aligned with the pattern 3. This alignment may be obtained by lighting the security document DOC from the bottom so as to cause the pattern 3 to appear so that a laser marking appliance having image acquisition means can observe the color pattern 3 in order to direct the laser beam. Illuminating the bottom of the security document is described in greater detail with reference to FIGS. 3B and 3C.

It should be observed that each grayscale element EL may have a shade lying in the range transparent to completely black. In the figure, grayscale elements EL are shown that extend through the entire thickness of the laserizable first layer, but without that being limiting, since it is possible to select a laser beam or a thickness for the laserizable first layer that are suitable for ensuring that only a portion of the laserizable first layer is laserized.

FIG. 3A shows the document DOC seen from the top (the face F1 is visible), without the face F2 being illuminated.

There can be seen a grayscale image IG that, in this example, comprises a letter A constituted by the laserized elements EL described with reference to FIG. 2, which can be seen on a background having the color of the second layer 2 of FIG. 2, e.g. white.

The letter A presents a shade of gray.

FIG. 3B shows the document DOC, still in top view, with the face F2 facing towards the sun. A colored image IC appears in which the previously visible letter A appears in color because it overlies the color pattern 3 of FIG. 2, which can be seen in part as a result of the light intensity applied to the bottom of the security document DOC. In this example, the thickness of the second layer 2 and its opacity are selected so that the pattern 3 appears in part and colors the letter A when oriented in this manner.

In the example shown, it should be observed that the color pattern 3 has the shape of the letter A as formed by the laserized elements: the letter A of the color pattern corresponds with the letter A formed by laserization as a result of the alignment and because the letters A that have been formed have the same dimensions.

The shade of the letter A is determined by the multitude of laserized elements that hide portions of the color pattern 3 at least in part. If the color pattern 3 has a plurality of colors, it is possible to hide some of the colors so as to select the hue that is observed.

Specifically, the laserization may be performed while taking account of the different colors in the color pattern in order to obtain a selected hue for the colored image IC.

FIG. 3C shows the document DOC placed on an appliance T configured for diascopic observation. The person skilled in the art seeking to use such an appliance can select the thickness and the opacity of the second layer 2 so that the color pattern 3 colors the grayscale image only when the face F2 of the security document is illuminated by being placed against a face of the appliance T. A colored image IC is then visible.

The person skilled in the art also knows how to determine the properties of the appliance T (orientation, focusing of the light beam, light intensity) so that the colored image appears.

FIG. 4 shows another embodiment of the security document DOC1 of the invention prior to laserizing. Elements that have the same references as those used in the preceding figures are analogous.

In this example, the security document DOC1 has a color pattern printed on the bottom of the second layer 2 in the form of a matrix 30 of color pixels 31. Each color pixel 31 of the pixel matrix comprises a red sub-pixel, a green sub-pixel, and a blue sub-pixel (these sub-pixels being designated by the letters R, G, and B in FIG. 4). In this example, three color pixels are shown, without that being limiting: very fine resolutions are possible (the sub-pixels may present dimensions of less than 150 micrometers (μm), or less than 50 μm).

In the matrix of color pixels, the pixels have a color arrangement that is repeated throughout the matrix, and these pixels are organized in a grid.

Furthermore, the security document DOC1 includes two additional printed patterns 71 and 72 that are arranged respectively on top of the fifth layer 4 and on the bottom of the second layer 2.

FIG. 5 shows the security document DOC1 as described with reference to FIG. 4, after performing the laserizing step.

After this laserizing step, the first layer 1 has been laserized so as to include grayscale sub-pixels 32 arranged respectively in register with the color sub-pixels R, G, or B in the pixel matrix. Reference 32 covers both the blackened portion of the laserizable first layer and the sub-pixel of the pixel 31. Grayscale pixels 33 are thus formed in register with the pixels 31 comprising red-green-blue sub-pixels. The grayscale pixels 33 form a grayscale image IG1.

It can be observed that in the matrix of color pixels and in the grayscale image IG1, the pixels and the sub-pixels all have the same dimensions, each grayscale sub-pixel having the same dimensions as a sub-pixel R, G, or B.

It should be observed that laserizing is performed while taking account of the positions of each of the color sub-pixels R, G, and B so as to obtain a selected hue for each grayscale pixel 33 when the security document is illuminated.

Thus, in the example shown, the first grayscale pixel 33 placed on the left has only one grayscale pixel 32 in register with a blue sub-pixel. This sub-pixel is marked so as to be opaque, so the color associated with the left grayscale pixel 33 aligned with the left color pixel 31 is yellow (red plus green).

The second grayscale pixel 33 located in the middle has two grayscale sub-pixels 32 placed respectively register with a red sub-pixel and a green sub-pixel. The color associated with the middle grayscale pixel 33 in alignment with the middle pixel 31 is green.

The third grayscale pixel 33 placed on the right has two grayscale sub-pixels 32 placed in register respectively with a red sub-pixel and with a green sub-pixel. The color associated with the right grayscale pixel 33 in alignment with the right pixel 31 is blue.

Other grayscale sub-pixels may be formed by laserization, in particular sub-pixels that are not totally opaque, so as to obtain a large number of possible colors for each pixel.

FIG. 6A shows the document DOC1 described with reference to FIG. 5 in top view (its face F1 is visible). In this figure, the face F2 is not illuminated.

In this example, without illumination, there can be seen the grayscale image IG1 in the first layer 1.

FIG. 6B shows the document DOC1 described with reference to FIG. 5 in top view. In this Figure, the face F2 of the document DOC1 is illuminated (by the sun or by a lighting device).

With illumination, a colored image IC1 is seen to appear as a result of the alignment between the grayscale pixels 33 of the first layer 1 and the pixels 31 of the pixel matrix comprising the red-green-blue sub-pixels.

FIG. 7 shows a security document DOC2 in another variant of the invention in which a third layer 8 is arranged below the second layer 2 and the matrix of pixels comprising red-green-blue sub-pixels.

The third layer 8 may be opaque and may have the same composition as the second layer 2.

The third layer 8 serves to hide the pixel matrix when observing the bottom of the card.

In this variant, the thicknesses and the opacities of the second layer 2 and of the third layer 8 may be adapted so that the image remains colored when the bottom of the card is illuminated.

FIG. 8 shows a security document DOC3 in another variant of the invention. This variant corresponds to that described with reference to FIG. 7, but with the following additional elements: a laserizable fourth layer 9 is assembled below the layer 8 described with reference to FIG. 7, and this layer is a window within a sixth layer 10 that may be opaque and that may have the same composition as the second layer 2. In addition, the laserizable fourth layer 9 is in alignment with the laserizable first layer 1.

In the example shown, the laserizable first layer 1 has been laserized in a manner that is different from that described with reference to the figures and it has pixels 33 and sub-pixels 32. The laserizable fourth layer 9 has also been laserized and it has pixels 35 and sub-pixels 34.

For the pixel 33 to the left in the figure, a grayscale sub-pixel 32 has been formed in the laserizable first layer 1 in register with a blue sub-pixel.

For the pixels 33 and 35 in the middle in the figure, a grayscale sub-pixel 32 has been formed in the laserizable first layer 1 in register with a red sub-pixel, and a grayscale sub-pixel 34 has been formed in the laserizable fourth layer 9 in register with a blue sub-pixel.

For the pixel 35 on the right in the figure, two grayscale pixels 34 have been formed in the laserizable fourth layer 9 respectively in register with a red sub-pixel and with a green sub-pixel.

A grayscale image IG3 has thus been formed in the laserizable first layer 1 corresponding to half of the described grayscale image IG1, and an additional grayscale image IG3' has been formed in the laserizable fourth layer 9.

As a result, it can be understood that the same number of grayscale sub-pixels have been formed in alignment with the same color sub-pixels as in the example shown with reference to FIG. 5.

FIG. 9A shows the security document DOC3 described with reference to FIG. 2 seen from the top, without the face F2 of the security document illuminated.

As can be seen in this figure, half of the grayscale image IG3 is visible because of the sub-pixels 32 that are visible from the face F1. The half of the window in which the laserizable first layer 1 is arranged and that does not include laserized elements allows the opaque second layer 2 to appear.

FIG. 9B shows the security document DOC3 described with reference to FIG. 8 when seen from the top while its face F2 is illuminated. A colored image IC3 can be seen to appear that is similar to the image visible in FIG. 6B.

In this example, the grayscale image IG3 that was visible in FIG. 9A is associated with the additional grayscale image IG3' formed in the laserizable fourth layer 9, and colors are likewise visible as a result of the positions of the grayscale elements and as a result of the illumination.

The invention claimed is:

1. A security document comprising:

a laserizable first layer including a grayscale image formed by laserizing;

a color pattern in alignment with said grayscale image;

a second layer arranged between said laserizable first layer and said color pattern, the laserizable first layer being above the second layer, and said color pattern being below the second layer, the second layer being more opaque than the laserizable first layer;

a third layer below said color pattern, the third layer being more opaque than the laserizable first layer; and a laserizable fourth layer below said color pattern or below said third layer, wherein the laserizable fourth layer includes an additional grayscale image formed by laserizing, wherein the additional grayscale image of the laserizable fourth layer is in alignment with said color pattern;

wherein the opacity of the second layer and the opacity of the third layer are such that when observing the security document from the top, said grayscale image appears to be colored by the color pattern only when the bottom of the security document is being illuminated.

2. A security document according to claim 1, wherein the color pattern includes at least two elements of different colors, and the laserizable first layer is laserized while taking account of the colors of said two elements of different colors.

3. A security document according to claim 2, wherein the color pattern is a matrix of color pixels, each pixel comprising a plurality of sub-pixels of different colors, and the grayscale image includes grayscale pixels comprising grayscale sub-pixels in alignment with the sub-pixels of different colors in the color pattern.

4. A security document according to claim 1, wherein the laserizable first layer is a window arranged within a fifth layer that is more opaque than the laserizable first layer.

5. A security document according to claim 4, wherein an additional pattern is formed above said fifth layer.

6. A security document according to claim 1, wherein an additional pattern is formed below said third layer.

7. A security document according to claim 1, wherein the grayscale image of the laserizable first layer is associated with the additional grayscale image of the laserizable fourth layer in such a manner that when observing the security document from the top, a complete colored image appears only when the bottom of the security document is being illuminated.

8. A security document according to claim 1, wherein the third layer lacks holes.

9. A fabrication method for fabricating a security document, the method comprising:

assembling together a laserizable first layer and a second layer below the laserizable first layer, the second layer being more opaque than the laserizable first layer;

forming a color pattern below the second layer;

assembling a third layer below the color pattern, the third layer being more opaque than the laserizable first layer; and laserizing a grayscale image within the laserizable first layer, the color pattern being in alignment with said grayscale image;

wherein a laserizable fourth layer is assembled below said color pattern or below said third layer, wherein an additional grayscale image is laserized in the laserizable fourth layer, wherein the additional grayscale image in the laserizable fourth layer is in alignment with said color pattern; and wherein when observing the security document from the top, said grayscale image appears to be colored by the color pattern only when the bottom of the security document is being illuminated.

10. A fabrication method according to claim 9, wherein the color pattern is formed by forming a color pattern having at least two elements of different colors, and the laserizable first layer is laserized while taking account of the colors of said two elements of different colors.

11. A fabrication method according to claim 10, wherein the color pattern is a matrix of color pixels, each pixel comprising a plurality of sub-pixels of different colors, and the grayscale image is formed by laserizing so that it includes grayscale pixels comprising grayscale sub-pixels in alignment with the sub-pixels of different colors in the color pattern.

12. A fabrication method according to claim 9, wherein the laserizable first layer is a window that is arranged within a fifth layer that is more opaque than the laserizable first layer.

13. A fabrication method according to claim 12, wherein an additional pattern is formed above said fifth layer.

14. A fabrication method according to claim 9, wherein an additional pattern is formed below said third layer.

15. A fabrication method according to claim 9, wherein the grayscale image of the laserizable first layer is associated with the additional grayscale image of the laserizable fourth layer in such a manner that when observing the security document from the top, a complete colored image appears only when the bottom of the security document is being illuminated.

16. A fabrication method according to claim 9, wherein the laserizable first layer is laserized while the bottom of the security document is being illuminated.

17. A method of reading a security document obtained by the method according to claim 9, wherein the security document is illuminated from the bottom and the security document is observed from the top.

18. A fabrication method according to claim 9, wherein the third layer lacks holes.

* * * * *